United States Patent [19]

Ephere et al.

[11] Patent Number: 4,746,393
[45] Date of Patent: May 24, 1988

[54] APPARATUS AND METHOD FOR THE PRODUCTION OF HOLLOW BODIES OF REVOLUTION FORMED FROM THREADS EXTENDING IN THREE DIFFERENT DIRECTIONS

[75] Inventors: Jean-François Ephere, Pessac; Serge Durand, Cestas; Bruno Bompard, Lyon; Alain Bruyere, Villefontaine, all of France

[73] Assignees: Commissariat a l'Energie Atomique, Paris; Etablissements Brochier, Decines Charpieu Cedex, both of France

[21] Appl. No.: 907,965

[22] Filed: Sep. 16, 1986

[30]    Foreign Application Priority Data

Sep. 18, 1985 [FR]   France ............................. 85 13823

[51] Int. Cl.⁴ ..................................... B65H 81/00
[52] U.S. Cl. .................... 156/361; 156/173; 156/175; 156/189; 156/429; 156/430; 156/446; 242/7.01; 242/7.21
[58] Field of Search ............... 156/169, 173, 175, 188, 156/190, 192, 425, 428, 429, 430, 431, 174, 171, 172, 189, 195, 432, 446, 361; 242/2, 7.01, 7.21

[56]             References Cited
U.S. PATENT DOCUMENTS

| | | | |
|---|---|---|---|
| 1,397,771 | 11/1921 | Mort | 269/69 |
| 3,040,604 | 6/1962 | Benton | 269/69 |
| 3,448,253 | 6/1969 | Bramblett, II et al. | 242/2 |
| 4,080,915 | 3/1978 | Bompard et al. | 242/7.21 |
| 4,240,863 | 12/1980 | Vinton | 156/446 |
| 4,353,399 | 10/1982 | Harris | 269/69 |
| 4,394,203 | 7/1983 | Bompard et al. | 156/175 |
| 4,596,619 | 6/1986 | Marks | 156/195 |

FOREIGN PATENT DOCUMENTS

A2509706  1/1963  France .
A2408676  6/1979  France .

Primary Examiner—Jerome Massie
Assistant Examiner—Daivd Herb
Attorney, Agent, or Firm—Dennis P. Clarke

[57]              ABSTRACT

The invention relates to a process for the production of hollow bodies of revolution formed from threads extending in three different directions, as well as to a machine for performing this process. The machining of a mandrel, the installation or implantation of retaining or locking rings on this mandrel, the winding and weaving of the threads in circumferential, longitudinal passages formed between the locking rings and the appropriate dimensional controls and checks are carried out on the same machine. On one side of the horizontal axis of the machine is provided a mobile support on which can be mounted the subassemblies for machining the mandrel, the implantation of the locking rings, winding and control, the weaving system being placed on the other side of the axis. In order the facilitate the weaving operations, the weaving carriage moves parallel to a fictitious generatrix joining the ends of the body, the weaving means being oriented perpendicular to said generatrix.

6 Claims, 12 Drawing Sheets

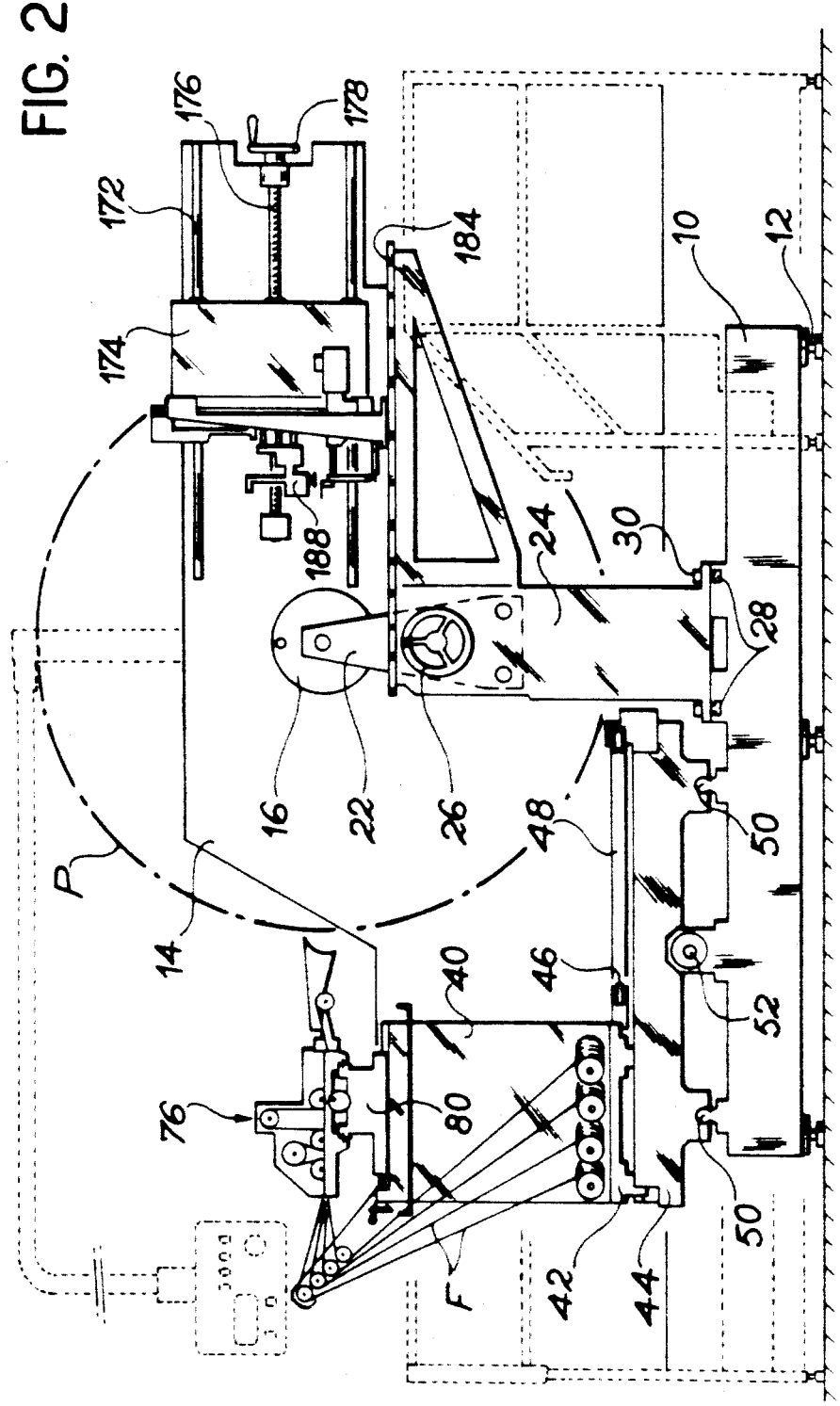

APPARATUS AND METHOD FOR THE PRODUCTION OF HOLLOW BODIES OF REVOLUTION FORMED FROM THREADS EXTENDING IN THREE DIFFERENT DIRECTIONS

BACKGROUND OF THE INVENTION

The present invention relates to a process for the production of hollow bodies of revolution formed from wires, filaments or threads extending in three different directions. The invention also relates to a machine for performing this process.

The directions of the wires constituting the body of revolution are substantially radial, axial and circumferential, which can in certain cases be substantially different from the corresponding geometrical directions.

The production of such three-dimensional woven bodies or parts can take place with any type of thread or wire and particularly those made from glass, carbon, graphite, ceramic materials, etc. Therefore, in this sense the term thread will be used herein to designate fibres, wires, wicks, strands, woven fibres, etc.

It is presently known to install or implant retaining or locking rings radially on a support mandrel from a material permitting said installation, so as to define between said rings longitudinal and circumferential passages, in which are then placed by winding and weaving layers of superimposed threads, after which the support mandrel is removed. Such a process is more particularly known from French patent No. 2 408 676, filed on Sept. 23, 1977 by the Commissariat à l'Energie Atomique.

An improvement to this process was proposed in French patent application No. 81 13868 filed on July 16, 1981 by the Commissariat à l'Energie Atomique. This improvement relates to the installation of the retaining rings and, as a result of a prior perforation of the mandrel, makes it possible to install in a satisfying manner larger retaining rings.

Despite the advantages offered by these processes and the machines ensuring the performance thereof, certain problems still occur, particularly when it is wished to significantly increase the dimensions of the bodies to be produced and also when modifying the shapes thereof.

Thus, the means normally used for winding and weaving the threads in the passages formed between the retaining ring generally comprise a weaving carriage which moves permanently in parallel to the mandrel axis. During the machining of non-cylindrical parts, such as those which are conical, truncated cone-shaped or having even more complex shapes, the unwinding of the weft on leaving the weaving means takes place under different conditions as a function of whether said means moves in one or other direction, because said means is oriented perpendicular to the weaving carriage. Moreover, in the case of a large non-cylindrical part, this can lead to not placing the weft between the wedges, but beyond the latter on a lengthwise portion of the part.

Furthermore, the presently known processes involve the successive use of several different machines. Thus, it is necessary to successively use a machine for machining the support mandrel, a machine for installing the retaining rings on said mandrel and a machine for the winding and weaving of the threads in the passages formed between the rings. Apart from the obvious disadvantages linked with the number of machines used (cost, maintenance, personnel, etc.), it should be noted that the increase in the dimensions of the parts leads, in the case of equal tolerances, to it being more difficult to control each of the machines so as to take account of the operation performed by the preceding machine. Thus, in particular as the dimensions of the part increase, it becomes more difficult to adjust the spacings of the winding and weaving as a function of the spacing of the installation of the retaining rings.

Finally, it should be noted that at present no machine is known which makes it possible to produce hollow parts or bodies of revolution which can be up to 1500 mm long and which can have an external diameter varying between 60 to 2100 mm.

SUMMARY OF THE INVENTION

The present invention relates to a process for the production of hollow bodies of revolution making it possible to produce parts or bodies having such widely differing dimensions and shapes with a high degree of precision and on a single machine, which makes it possible to eliminate all control problems linked with tolerances. Moreover, said machine can fulfill supplementary functions, such as the checking or inspection of parts during manufacture.

The present invention therefore proposes a process for the production of hollow bodies of revolution formed from threads extending in three different directions, called radial, axial and circumferential directions, comprising the stages of producing a support mandrel from a material able to receive retaining rings by implantation, implantation on the mandrel of retaining rings forming the threads extending in a radial direction, in accordance with a regular pattern or network defining between the retaining rings longitudinal and circumferential passages, alternate winding and weaving of the threads in the circumferential and longitudinal passages to form a stack or pile of thread layers extending alternately in the circumferential and axial dimensions and wherein this process is characterized in that the weaving steps are performed by moving a weaving means parallel to the fictitious generatrix joining the ends of the body to be produced, the weaving means being oriented substantially parallel to said fictitious generatrix.

Preferably, the winding and weaving stage is then followed by the elimination of the support mandrel by machining.

According to another aspect of the process according to the invention, particularly appropriate in the case of large bodies, the support mandrel production stage comprises bonding parallelepipedic blocks in a material able to receive the retaining rings by implantation on the faces of a hard material block having a square section and machining the parallelepipedic blocks by turning the thus formed assembly supported by the square section block.

The present invention also proposes a machine for the production of hollow bodies of revolution formed from threads extending in three directions, called the radial, axial and circumferential directions, wherein it comprises a chassis, a headstock mounted at one end of the chassis, a spindle supported in rotary manner by the headstock, means for controlling the rotation of the spindle, a tailstock mounted at the other end of the chassis in front of the spindle and defining therewith a substantially horizontal common axis, means for displacing the tailstock along said axis, a mobile support able to successively receive several interchangeable working subassemblies constituted by a retaining ring implantation subassembly and a winding subassembly, mounted on one side of the chassis with respect to said axis, first means for displacing the support parallel to said axis at a speed proportional to the rotation speed of said spindle, second means for controlling a fast displacement of the support parallel to said axis, means for displacing the support perpendicular to said axis, in order to follow a first pattern having the profile of the part or body to be produced, a weaving assembly mounted on the other side of the chassis with respect to said axis and having a beam supporting in a mobile manner a weaving carriage and means for moving the carriage along the beam in reciprocating manner, the weaving carriage supporting a weaving means via means for displacing the latter perpendicular with respect to said beam so as to follow a second pattern, the beam being mounted on the chassis via regulatable orientation means.

Thus, the displacement of the weaving carriage can take place as close as possible to the body, the beam being oriented parallel to the means generatrix of said body. It is therefore possible to reduce the overhang of the weaving carriage and to bring about a satisfactory unwinding of the weft in both displacement directions of the weaving carriage, no matter what the profile of the body to be produced.

For this purpose, the end of the beam adjacent to the headstock is preferably articulated on a carriage which can be moved perpendicular to the axis of the machine by appropriate regulating means, the opposite end of the beam being mounted on a slide fixed to the chassis.

Preferably, the winding subassembly comprises an interchangeable part which can be replaced by a mandrel machining subassembly and a dimensional control subassembly is associated permanently with the winding subassembly, which makes it possible to carry out such a check or control both during the machining of the mandrel and during winding.

According to another aspect of the invention, the winding subassembly comprises a planar plate oriented perpendicular to said axis and entering a circumferential winding passage formed between the retaining rings at the front of the winding thread, bearing in mind the rotation direction of the body. Preferably, means are then provided for reversing the orientation of said plate as a function of the rotation direction of the body.

According to yet another aspect of the invention, a beam integral with the weaving beam and parallel thereto supports two weft attachment devices level with the ends of said body for holding in place the ends of the weft deposited by the weaving means during the deposition thereof.

BRIEF DESCRIPTION OF THE DRAWINGS

The invention is described in greater detail hereinafter relative to non-limitative embodiments and with reference to the attached drawings, wherein show:

FIG. 2—An end view of the machine according to FIG. 1.

DETAILED DESCRIPTION OF THE PREFERRED EMBODIMENTS

According to the main features of the invention, the machine according to the invention makes it possible to machine the support mandrel, implant or install retaining rings radially in the mandrel with the prior perforation of the latter, winding and weaving superimposed layers forming the body and geometrical checking both following the machining of the support mandrel and at different levels during the winding and weaving of the body.

In order to perform these different functions, it will be shown hereinafter that the machine according to the invention has been designed in such a way that the machining of the mandrel, the installation of the retaining rings, winding and inspection or control are performed by appropriate subassemblies which are in turn fitted or, in the case of some of these, are simultaneously fitted on a mobile support placed on one side of the machine with respect to the geometrical axis thereof corresponding to the axis of the body to be machined, whereas weaving takes place from the opposite side. This arrangement makes it possible to free the access to the machine from the top which aids the fitting of the mandrel prior to its machining and particularly the removal of the finished member, e.g. by means of a lifting equipment.

Figure 1:
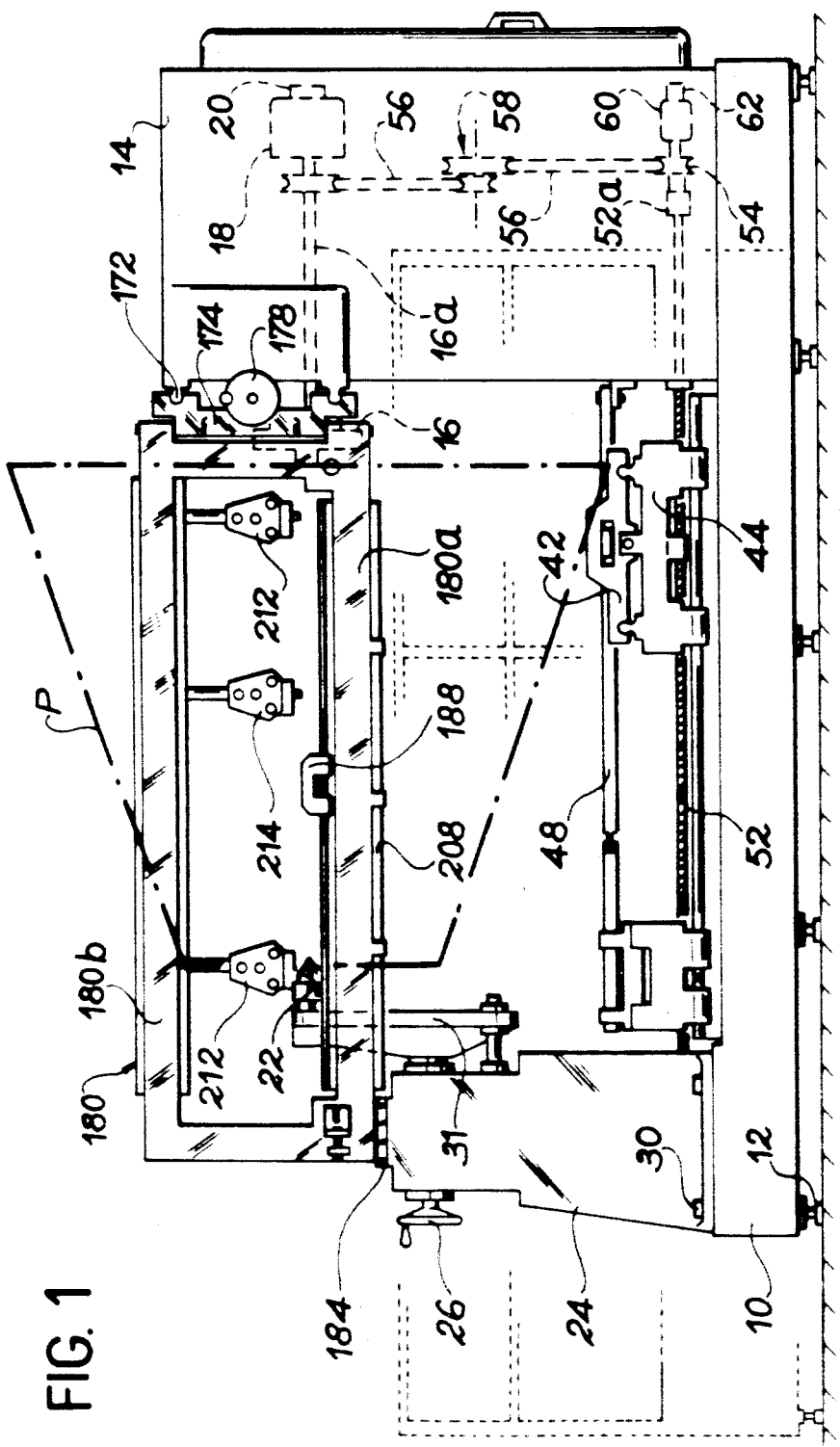
FIG. 1—A front view of a machine according to to the invention for producing large hollow bodies of revolution taken from the side of the weaving carriage.

On referring to FIGS. 1 and 2, it can be seen that the machine according to the invention comprises a chassis 10 resting on the ground via a certain number of jacks 12 bringing it to its correct level. At the right-hand end of FIG. 1, chassis 10 supports a headstock 14 on which is mounted in rotary manner a horizontally axed spindle 16. The rotation of spindle 16 is controlled by a reduction servomotor 18, with which is associated an optical coder 20. Servomotor 18 is equipped with a brake for emergency stopping purposes. At its opposite end, chassis 10 supports a tailstock 22 facing spindle 16 and whose common horizontal axis with the latter defines the machine axis.

Throughout the remainder of the description, X will be used for the direction defined by this axis and Y for the horizontal direction perpendicular to said axis.

Tailstock 22 is mounted on a bracket 24 so that it can be displaced over a certain distance parallel to the machine axis by acting on a wheel 26. This ensures the fitting and removal of the mandrel and the body which it supports, represented diagrammatically by mixed lines at P in FIGS. 1 and 2.

Furthermore, bracket 24 can move parallel to the machine axis on slides 28 (FIG. 2), so as to permit the positioning of tailstock 22 with respect to spindle 16, as a function of the length of the mandrel and the body to be produced. When this setting has been performed, the bracket 24 is immobilized with respect to chassis 10 by tightening bolts 30. It should be noted that the displacement of bracket 24 along slides 28 is preferably controlled by a not shown reduction motor or gear associated with a rack.

Tailstock 22 is mounted on bracket 24 via an intermediate part 31, in such a way that the tailstock is located above the upper end of the bracket. This makes it possible to bring the weaving pattern into the working position. Preferably the mandrel supporting the body is itself mounted on a not shown support shaft, which is designed so as to be able to support a heavy member and prevent any sliding.

As is more particularly illustrated in FIG. 2, chassis 10 also supports, on the left-hand side of the machine with respect to the vertical plane passing through the axis thereof, a mobile support 40 able to receive different machining subassemblies.

More specifically, said mobile support 40 is fixed to a first ball guidance table 42, which is itself mounted on a second ball guidance table 44, so as to be able to move perpendicularly to the vertical plane passing through the machine axis in direction Y. The object of this movement is to permit the mobile support 40 and the machining subassembly supported by it to follow the profile of the bodies to be produced when it travels parallel to the machine axis.

This movement is brought about by a not shown pneumatic jack interposed between tables 42 and 44, in order to permanently maintain a roller 46 against table 42 bearing against a winding pattern or cam 48 fixed to table 44. Cam 48 is interchangeable and corresponds to the profile of the body to be woven. Thus, the machining subassemblies mounted on mobile support 40 automatically follow the profile of the body to be produced, when said support moves parallel to the machine axis.

In order to permit this movement of mobile support 40 parallel to the machine axis in direction X, lower table 44 is mounted on chassis 10 via slides 50 parallel to said axis, the control of the movement of the table being brought about by means of a ball spring 52, which is also parallel to axis X. The pitch of screw 52 can be e.g. be 6 mm. The rotating of ball screw 52 has the effect of moving table 44, mobile support 40 and the machining subassemblies supported by the same parallel to machine axis X.

As a function of the task to be fulfilled, this rotary control of ball screw 52 can be realized by two different means. Thus, the movement speed of table 44 must be relatively slow during the actual machining, i.e. both during the machining of the mandrel and during the installation of the locking rings and the winding, whereas a rapid movement is desirable, e.g. during control or inspection and when each operation is finished. Moreover, the need to carry out operations such as the installation of locking rings and winding with a constant pitch and in a controller manner makes it necessary for the slow movements of the table 44 during machining to be controlled at the same time as the rotation of the mandrel and the body, whereas fast movements must be performable independently of the mandrel rotation and even when the latter does not rotate.

Bearing in mind these operating requirements, FIG. 1 diagrammatically shows that the spindle of ball screw 52 supports a disengageable pulley 54 connected to the rotary drive shaft 16a of spindle 16 by two notched belts 56 and an intermediate interchangeable pulley 58. The replacement of intermediate pulley 58 makes it possible to easily modify the axial pitch of the bodies to be woven. Thus, if the pitch of the ball screw is 6 mm, it is possible to give the weaving pitch or spacing values such as 2.5, 3, 4 or 5 mm.

The fast rotation of ball screw 52 is controlled by a direct current motor 60 acting directly on screw spindle 52a. An optical coder 62 associated with motor 60 given information on the position of support 40 along axis X.

As is very diagrammatically illustrated by FIGS. 3a to 3d, different subassemblies can be successively mounted on mobile support 40, as a function of the particular body production stage being performed.

Figure 3A:
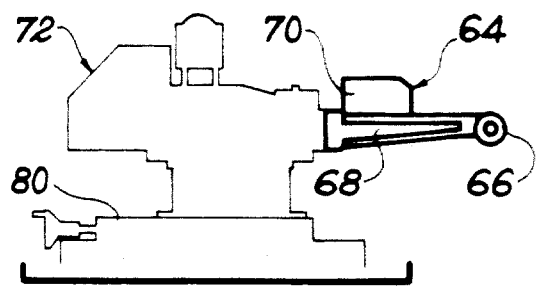
FIGS. 3a, 3b, 3c and 3d—Side views diagrammatically showing the mandrel machining subassembly, the wedge implantation subassembly, the winding subassembly and the control subassembly successively or simultaneously placed on a moving support provided for this purpose on the machine.

Thus, FIG. 3a shows the mandrel machining subassembly 64 which essentially comprises a tool 66, such as a grinding wheel mounted at the end of an arm 68 and whose rotation is controlled by a motor 70. Arm 68 is fixed to a support 72, whereof only the silhouette is shown in FIG. 3a. In practice, support 72 is constituted by the winding subassembly on which the machining subassembly 64 is mounted in place of a roller holder, as will be shown hereinafter. Support 72 is interchangeably fixed to a horizontal table 80 which moves in direction Y on support 40. Preferably, machining subassembly 64 also comprises a not shown suction means located alongside wheel 66 and which collects all the machining dust.

It should be noted that the use of a wheel as the mandrel machining tool is justified by the fact that the advance of mobile support 40 controlled by the rotation of screw 52 takes place in accordance with a relatively large spacing corresponding to the installation spacing of the retaining rings and the winding of the circumferential threads.

It should be noted that the installation of a mandrel machining means on the machine according to the invention is particularly useful for the production of large bodies, for which the machining of the mandrel could only take place on special machines.

It is also pointed out that the production of large diameter mandrels (which can read 2 m or even more) leads to a certain number of practical problems resulting from the dimensions of the commercially available foam blocks which are significantly less than the desired diameter. Thus, according to a secondary feature of the invention, these parallelepipedic blocks are bonded to the faces of a metal block having a square section, in order to produce a member having a metal central core and an outer foam structure. It is this member, which has an external square cross-section, which is machined by means of subassembly 64 to form the mandrel.

Figure 3B:
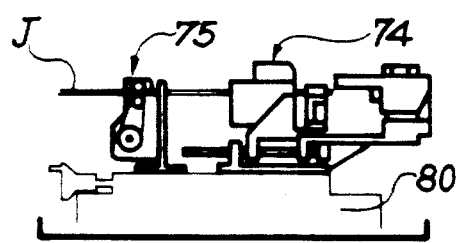

When the machining of the mandrel is at an end, support 72 carrying the machining subassembly 64 is dismantled and replaced by the subassembly for installing the locking rings on the thus machined mandrel and which is designated by the general reference 74 in FIG. 3b and will be described in detail hereinafter. With said subassembly 74 is associated a clutch 75 supplying the subassembly 74 in stepwise manner with a continuous horizontal locking ring J.

Figure 3C:
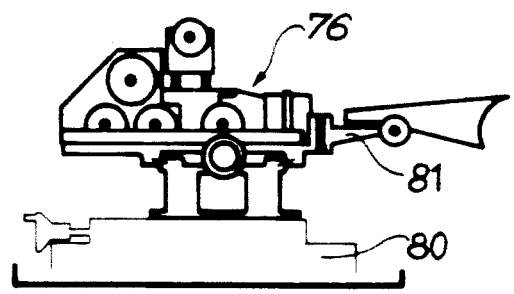
Figure 3D:
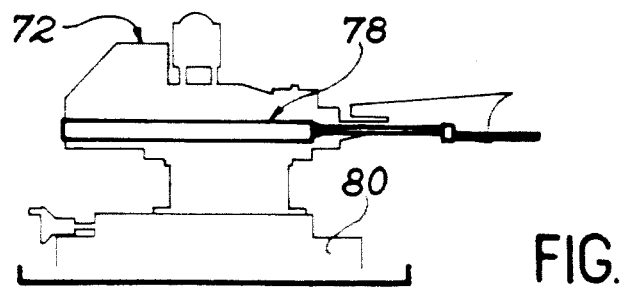

When the installation of the locking rings is at an end, subassembly 74 is in turn dismantled and replaced by the subassembly 76 for winding the circumferential threads between the retaining rings which have previously been installed on the mandrel in the manner illustrated in FIG. 3c. Subassembly 76 will also be described in greater detail hereinafter. It is alternatively realized with the weaving subassembly, which will also be described hereinafter.

FIG. 3 diagrammatically shows the dimensional control subassembly 78, which will be described hereinafter. Subassembly 78 is permanently associated with support 72, whose contour is shown in FIG. 3d. In view of the fact that support 72 is formed by the winding subassembly 76 from which the roller holder 81 has been removed (FIG. 3c), subassembly 78 is consequently permanently in place both during the machining of the mandrel with the aid of subassembly 64 and during the winding of the circumferential threads with the aid of subassembly 76. Dimensional controls or checks of the mandrel after machining and of the body being produced can then be carried out in accordance with a predetermined programme.

Each of the subassemblies 64, 74, 76 and 78 is designed in such a way that it acts on the mandrel or body level with the machine axis. In all cases, a precise setting of the position of the subassembly in direction Y can be performed with the aid of table 80 carried by mobile support 40 and to which are fixed the subassemblies.

A detailed description of subassembly 74 for implanting the retaining rings in the foam at least partly constituting the outer part of the mandrel will now be given with reference to FIGS. 4 to 6.

The retaining ring installation subassembly 74 firstly comprises a frame 82 which can be mounted on table 80. Frame 82 slidingly supports in the aforementioned direction Y, i.e. in a horizontal direction perpendicular to the machine axis, via two columns 84, a support plate 86. The adjustment of the position of support plate 86 on columns 84 makes it possible to vary the length of the installed locking rings. Support plate 86 has a horizontal hole 88 into which is introduced an uncut locking ring J. The introduction of the latter into hole 88 is carried out stepwise from a coil with the aid of supply system 75 (FIG. 3b).

Figure 6:
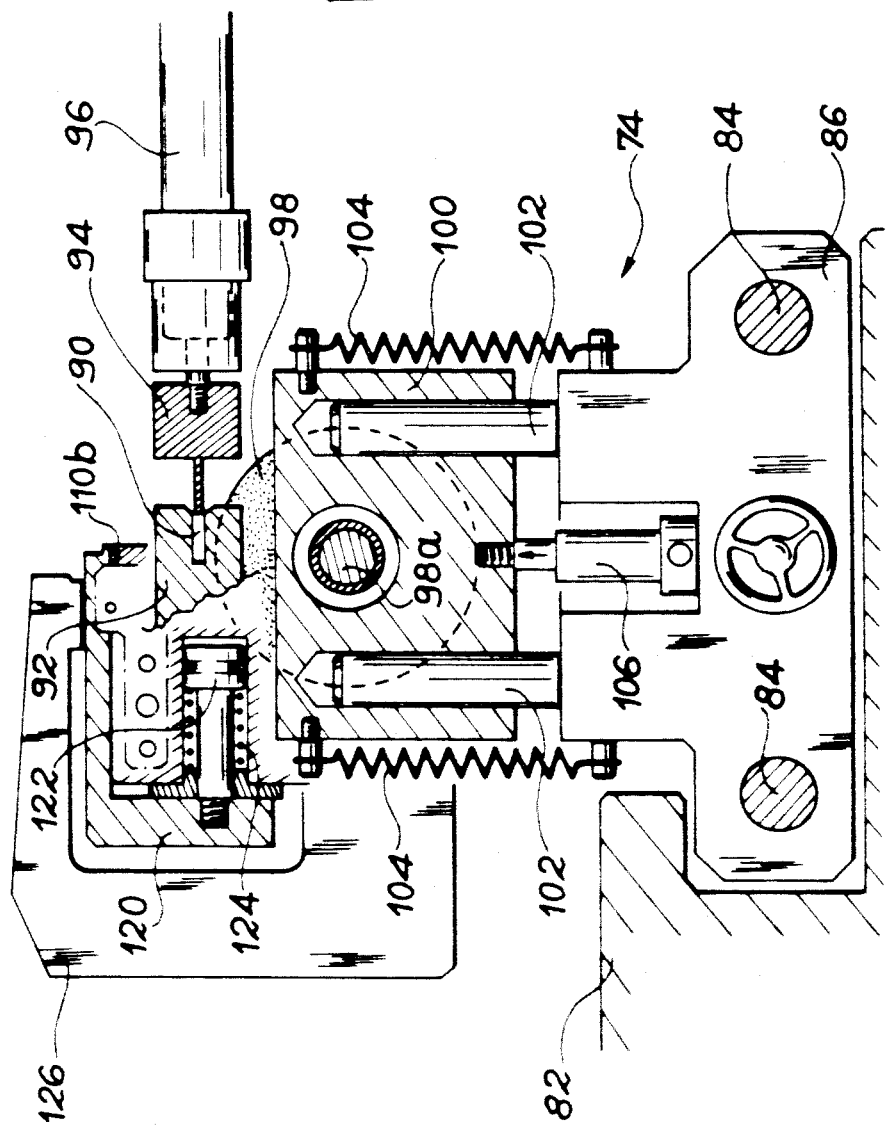

As is more particularly illustrated in FIG. 6, hole 88 is extended by a slot 90 formed in a female jaw 92 integral with plate 86. A mobile male jaw 94 is mounted in plate 86 so as to be able to move perpendicularly to retaining ring J, i.e. in FIG. 6 in direction X, under the action of jack 96. Thus, jaw 92 and 94 form a clamp making it possible to hold the uncut retaining ring end during the cutting of a segment thereof.

To this end, the clamp jaws 92, 94 are slightly set back with respect to a disk-like diamond grinding wheel 98 positioned perpendicularly to the retaining ring J. The horizontal spindle 98a of wheel 98 is mounted in rotary manner in a wheel support 100 supported by support plate 86. In order to permit the displacement of wheel 98 in a direction perpendicular to that of ring J, support 100 is slidingly mounted on plate 86 via guidance columns 102. Tension springs 104 are attached to support 100 and to plate 86 in order to bring wheel 98 into a position such that it is not located in the extension of hole 88 and slot 90. This waiting position is shown in FIGS. 4 and 6. The movement of the wheel counter to the action of springs 104 in order to control the cutting of retaining ring J is carried out by means of a jack 106 placed between plate 86 and support 100.

The rotation of wheel 98 is controlled by a motor 108 mounted on plate 86 and rotating the wheel spindle 98a via a belt and pulley system 110 positioned substantially perpendicularly to the displacement direction of support 100, so that the belt remains constantly in engagement with the pulleys.

Figure 4:
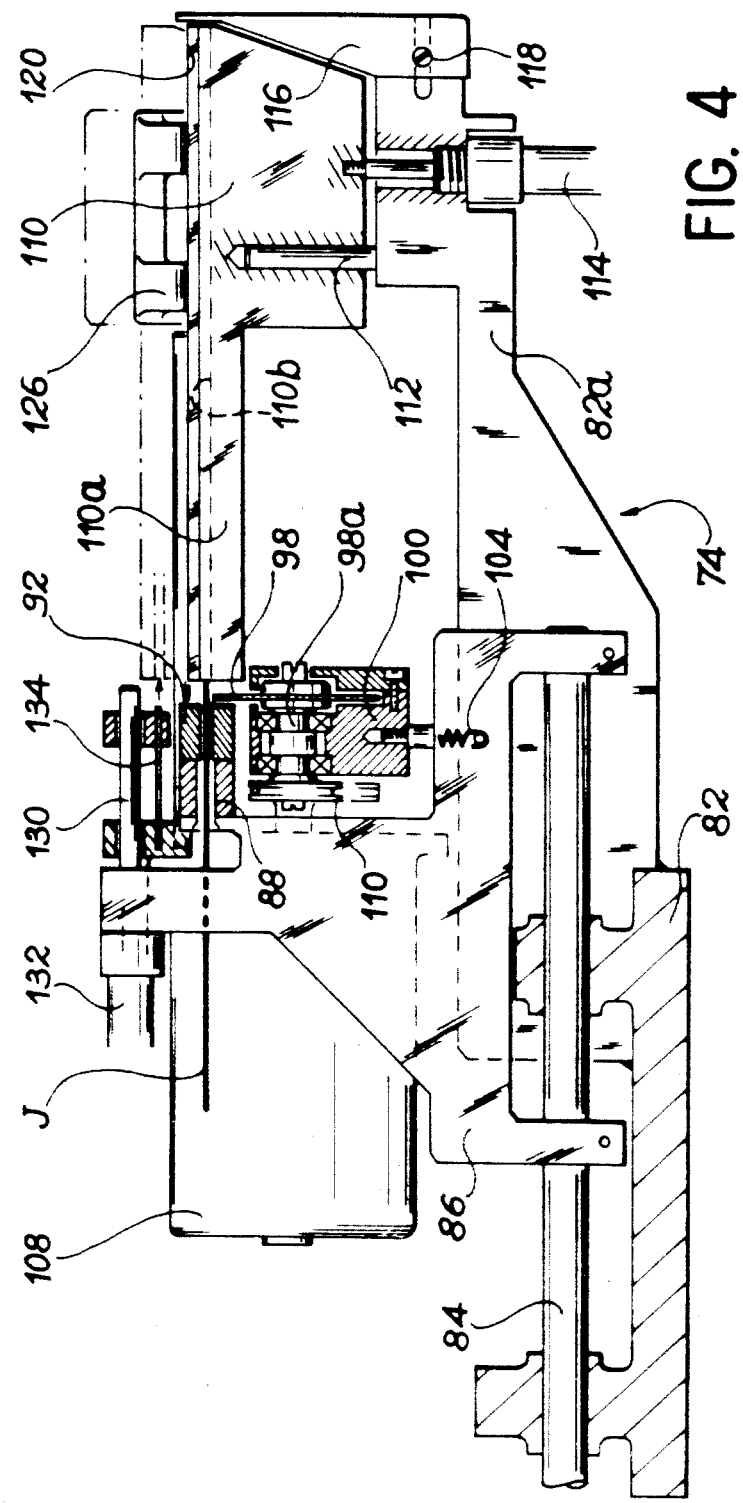
FIGS. 4, 5, and 6—Larger scale and part sectional views respectively showing in plan, side and end view the retaining ring implantation subassembly.

FIG. 4 shows that frame 82 has an extension 82a extending in the direction of the mandrel. At the end of the extension 82a is provided an implantation or installation head 110, whereof an extension 110a extends rearwards with respect to the mandrel up to the vicinity of wheel 98, in order to guide retaining ring J within a groove 110b. Installation head 110 is mounted on the end of extension 82a, so that it can move alternately upwards or downwards perpendicular to the horizontal path of ring J. For this purpose, head 110 is slidingly mounted on columns 112 integral with frame extension 82a. The control of the displacement of head 110 along columns 112 is carried out by means of a jack 114 placed between extension 82a and head 110. This vertical displacement of head 110 serves to bring the latter alternatively into a loading position in which groove 110b is placed in the extension of hold 88 by which retaining ring J arrives and an installation position located above the loading position.

When head 110 is in the loading position shown in FIG. 4, a stop 116 joined to the end of extension 82a closest to the mandrel by a screw 118 permitting an adjustment of the stop is located in the extension of groove 110b, so that locking ring J is arrested by stop 116 when introduced into the groove 110b.

Over the entire length of head 110, including extension 110a, groove 110b is normally closed by a door 120 (FIGS. 4 and 6), which is mounted on head 110, so as to be able to slide in the horizontal plane perpendicular to the direction of ring J under the action of a piston 122. A spring 124 normally maintains the door in its position ensuring the closure of groove 110b, the putting into operation of piston 122 serving to disengage the groove 110, so as to permit the rotation of the mandrel following the installation of a locking ring.

As is more particularly illustrated by FIG. 6, a toolstock 126 integral either with frame 82, or with head 110 makes it possible to permanently engage door 120 with the latter level with groove 110b.

Figure 5:
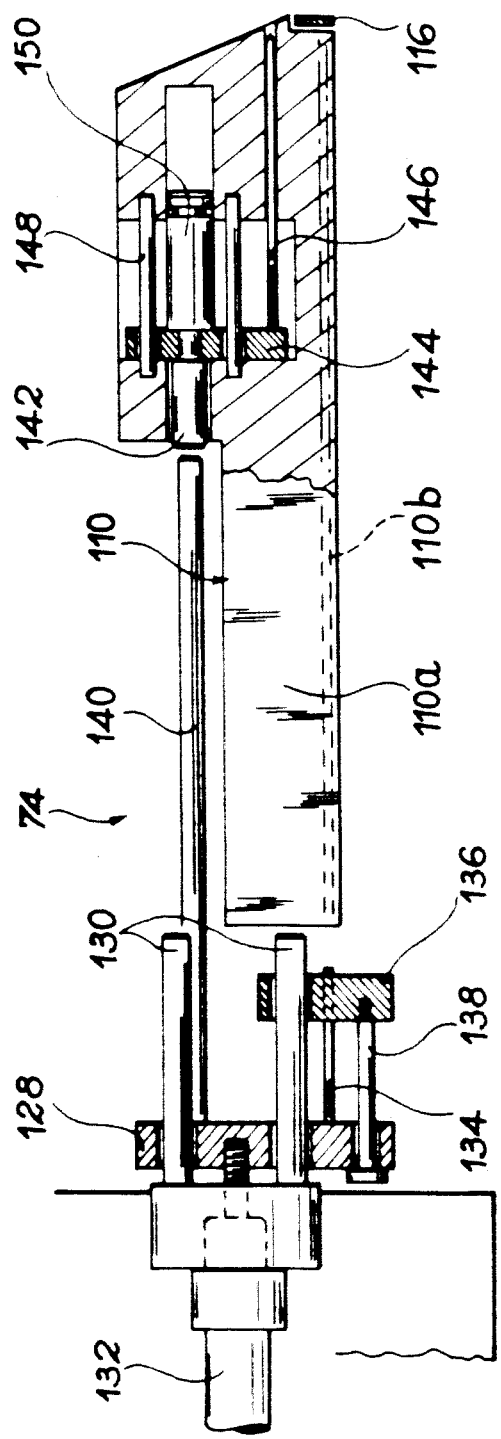

As is more particularly illustrated by FIGS. 4 and 5, support plate 86 also slidingly supports, approximately above jaws 92, 94 and the cutting means of the retaining ring associated therewith, a supporting plate 120. The latter moves parallel to the horizontal direction defined by the locking rings on columns 130 fixed to plate 86 under the action of a jack 132 also mounted thereon.

Supporting plate 128 firstly supports a thrust rod 134 located in the extension of groove 110b formed in head 100 when the latter is in the raised installation position. In view of the fact that in this position stop 116 no longer faces the end of groove 110b closest to the mandrel, it is clear that the putting into operation of jack 132 introduces the thrust rod 134 into groove 110b, which has the effect of installing the cut locking ring located in the groove over a distance slightly less than this displacement.

Preferably and as illustrated by FIG. 5, the end of thrust rod 134 passes through a guide 136 sliding on one of the columns 130 and itself supports a parallel column 138 slidingly received in supporting plate 128.

As is more particularly illustrated by FIG. 5, supporting plate 128 also supports a pre-hole control rod 140 also located parallel to the horizontal direction defined by locking ring J. When head 110 is located in the raised installation position, the end of control rod 140 bears against an anvil 142, mounted in sliding manner in head 110. Anvil 142 is integral with a punch holder plate 144 supporting a punch 146. The latter, which is also located in the horizontal direction defined by locking ring J, traverses the end of head 110 in such a way that its end is normally flush with the terminal face of the installation head when it is in the retracted position. The assembly formed by anvil 142, plate 144 and punch 146 moves within head 110 parallel to the direction defined by the joint on posts 148.

As a result of the action of rod 40 on anvil 142, putting jack 132 into action drives punch 146 into the mandrel, at the same time as a previously cut retaining ring is driven into the mandrel by rod 134. This leads to the simultaneous making of a perforation in the mandrel and the implantation of a cut locking ring in a previously made perforation.

In view of the fact that installation head 110 can move between the installation position and the loading position, it is not possible to control the return of punch 146 by acting on jack 132. For this reason, FIG. 5 shows that a return piston 150 is placed between head 110 and plate 144 opposite to anvil 142.

Figure 7:
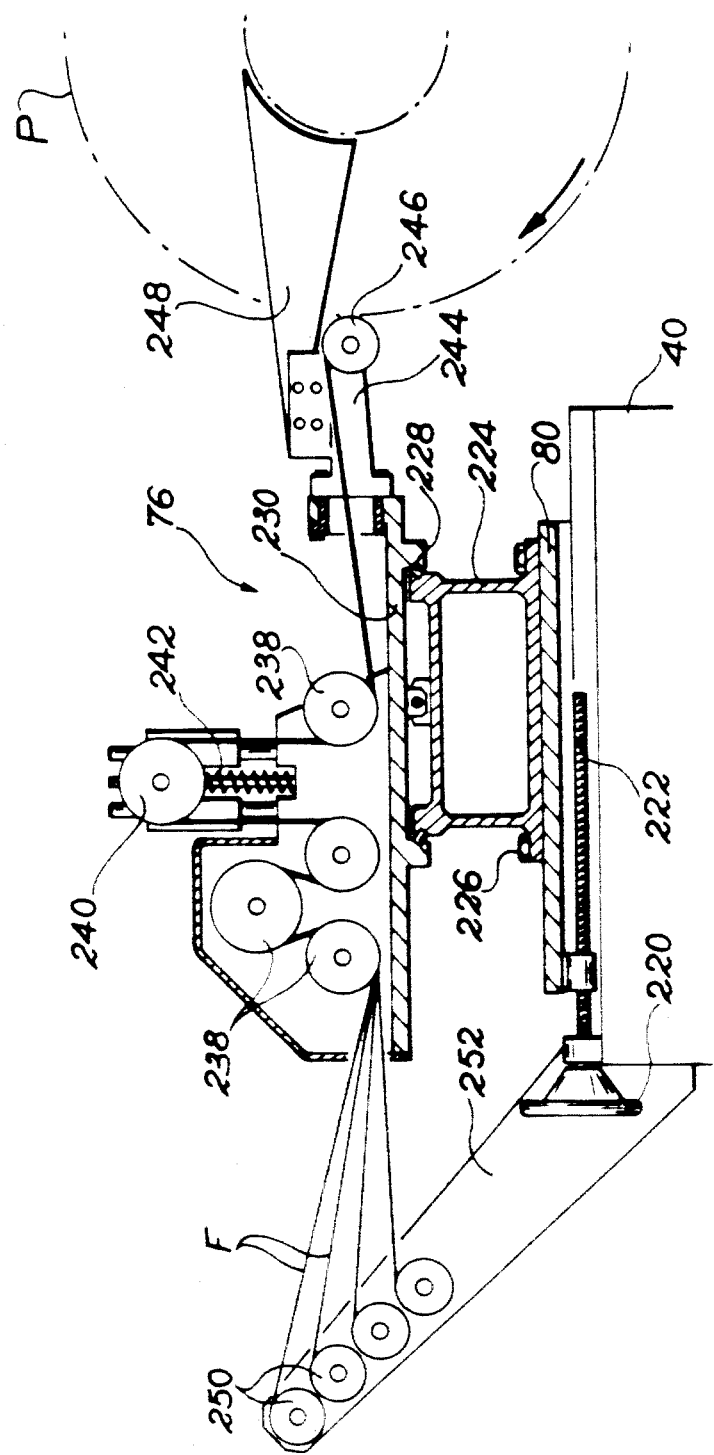
FIGS. 7 and 8—Side and front views diagrammatically representing the subassembly for winding and implanting the control subassembly with respect thereto.
Figure 8:
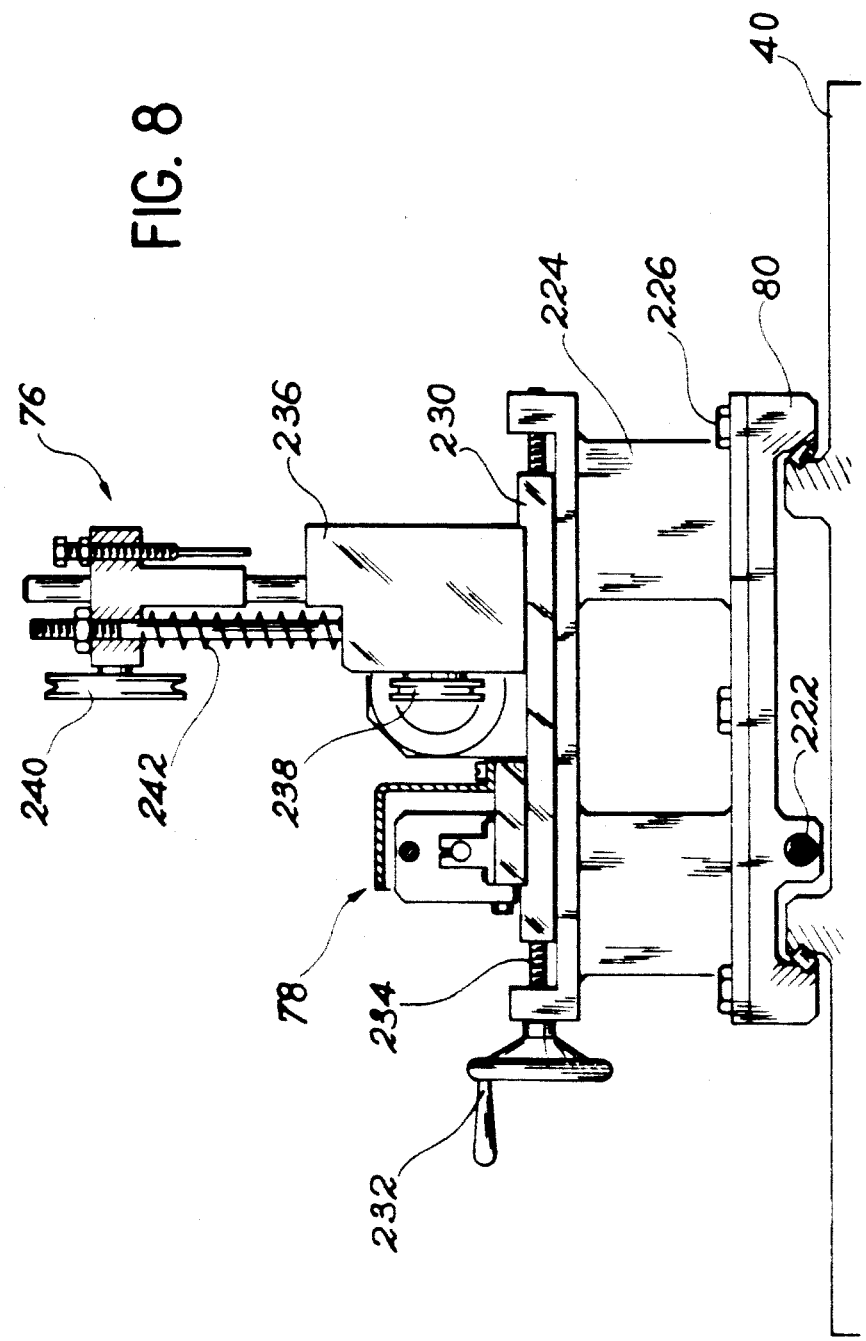

In order to respect the order of action of the different machine machining subassemblies according to the invention, a description will now be provided of the coiling subassembly with reference to FIGS. 7 and 8.

FIGS. 7 and 8 show the table 80 moving in direction Y with respect to support 42. The displacement of table 80 in accordance with Y is controlled by a wheel 220 acting on a ball screw 222. A frame 224 is fixed to table 80 by screws 226 and supports a plate 230 by slides 228 oriented in direction X. The position of plate 230 on slides 228 is regulated by acting on a wheel 232 integral with a ball screw 234.

As is more particularly illustrated by FIG. 8, the winding subassembly 76, as well as the control subassembly 78 are juxtaposed on plate 230. Thus, the knowledge of the displacement along axis X between these two subassemblies makes it possible to perform a precise dimensional control or check.

Winding subassembly 76 comprises a support part 236 on which are mounted the spindles of guide pulleys 238, as well as a tension pulley 240 elastically moved upwards by a spring 242. Together with plate 230 and frame 224, member 236 constitutes the support 72 (FIG. 3a) on which can be mounted the machining subassembly 64.

During its use in the winding subassembly, member 230 supports a pulley holder 244, whose end supports the coil or reel 246, positioned substantially at the same level as the machine axis. Pulley holder 244 also supports a flat or planar plate 248 perpendicular to the machine axis and whose end is curved in to supstantially adapt to the external shape of the mandrel. Plate 248 penetrates the circumferential passages formed between the retaining rings and ensures the spacing thereof no matter what their length. Thus, winding always takes place under satisfactory conditions.

FIG. 7 shows the position occupied by plate 248 when member P rotates in a clockwise direction. In the case of a counter clockwise rotation, a not shown device level with the connection between pulley holder 244 and support member 230 makes it possible to rotate pulley holder 244 and the plate 248 supported by it by 180° about a horizontal axis perpendicular to the machine axis The threads F coming from the reels carried by mobile support 40 (cf. FIG. 1) pass over return pulleys 250 carried by an arm 252 joined to support 40 and move round pulleys 238, 240 before being wound in circumferential passages by pulley 246.

A description will now be given in greater detail relative to FIG. 9 of the control subassembly 78, which is still in place on plate 230 when support 72 of the winding assembly 76 is mounted on said table.

Figure 9:
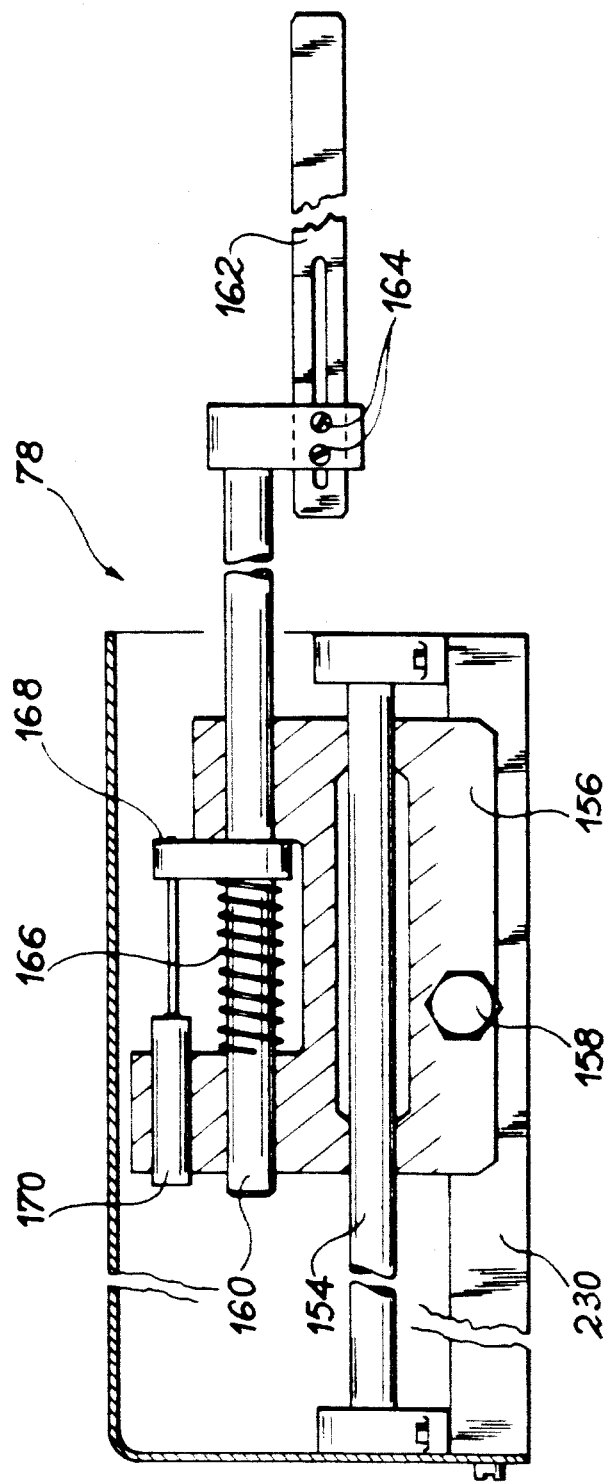
FIG. 9—A part sectional side view of the control subassembly.

Thus, FIG. 9 shows that the control subassembly 78 is mounted on the plate 230 of the winding subassembly. It comprises a column 154 fixed to plate 230 and oriented in direction Y. A member 156 is mounted on column 154 so as to be able to move between a rear rest position and a front working position shown in FIG. 7. In each of these positions, member 156 is immobilized by a ball plunger 158. Parallel to direction Y, member 156 supports a sliding shaft 160, whose front end carries a sensing finger 162 able to bear on the mandrel or on the body. The position of finger 162 relative to shaft 160 in direction Y can be regulated by means of screws 164. It should be noted that the guidance of column 160 in member 156 is carried out so as to prevent the rotation of finger 162.

When it bears on the mandrel or body to be controlled, finger 162 is slightly rearwardly displaced with respect to the position shown in FIG. 7, so as to compress a compression spring 166 acting between member 156 and column 160.

A connecting piece 168 integral with shaft 160 ensures the transmission of the translation movements of finger 162 to a displacement transducer 170 supported by member 156. A dimensional control of the mandrel and the body can therefore be carried out by contact at any time during production.

All the subassemblies designed to be fitted to the mobile support 40 of the machine shown in FIGS. 1 and 2 have now been described, a description will now be given of the weaving assembly located on the right-hand side of the machine relative to FIG. 2, i.e. on the other side of the body with respect to support 40 on the basis of FIGS. 10 to 12.

As shown by FIGS. 1 and 2, the headstock 14 carries on the side opposite to mobile support 40 two superimposed horizontal rails 172 extending perpendicular to the machine axis, i.e. in direction Y. On rails 172 is mounted a carriage 174, which can be moved along these rails by rotating a ball spring 176 with the aid of a wheel 178.

As can be more particularly seen in FIG. 1, a rigid frame 180 mainly formed by two parallel, superimposed, horizontal beams is articulated by a vertical spindle 182 (FIGS. 10 and 11) on carriage 174.

Rigid frame 180 extends over substantially the entire length of the machine alongside the body P to be machined and up to the tailstock 22. As is more particularly illustrated by FIGS. 1 and 2, frame 180 at this level bears against a slide 184 fixed in overhanging manner to bracket 24. The fixing of frame 180 to slide 184 makes it possible to immobilize frame 180 in the desired position.

It is pointed out that the structure described hereinbefore and which supports the weaving carriage makes it possible to perform a displacement thereof in a randomly regulatable direction. This direction will be parallel to the generatrix of the body in the case of a cylinder or conical part. In the case of a more complex shape, it will be parallel to the theoretical generatrix connecting the ends of the part. In all cases, it is possible to significantly limit the overhang of the weaving carriage.

This possibility of randomly orienting the rigid frame 180 with respect to the machine axis also makes it possible to orient the weaving means parallel to the weaving carriage displacement direction, which enables the weft to pass out of the weaving means under substantially identical conditions, no matter what the direction of movement of the carriage. Thus, it is possible to eliminate the disadvantages of the known weaving systems in which the weaving carriage permanently moves parallel to the machine axis, no matter what the shape of the body to be produced.

Figure 10:
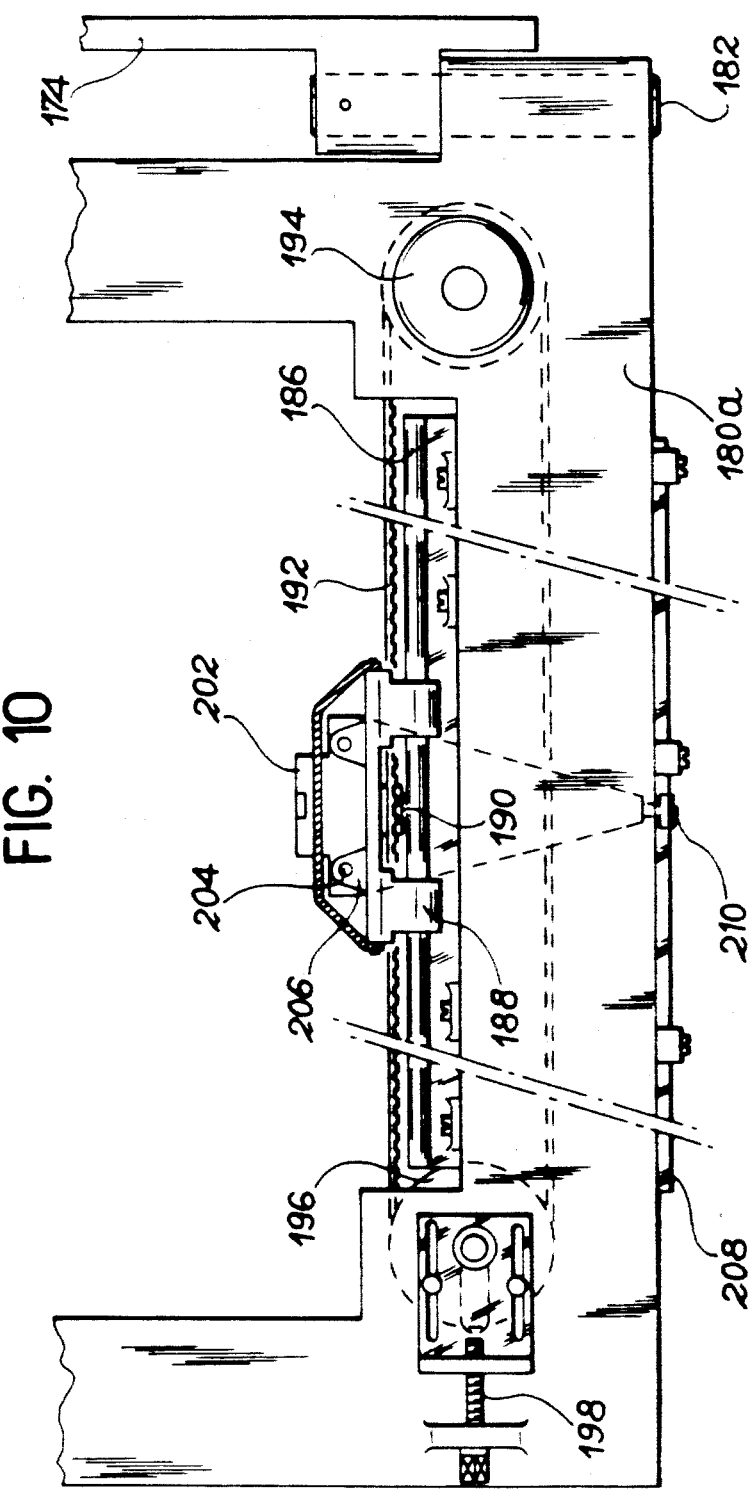
FIG. 10—A front view showing on a larger scale the fitting of the weaving carriage on the weaving beam.
Figure 11:
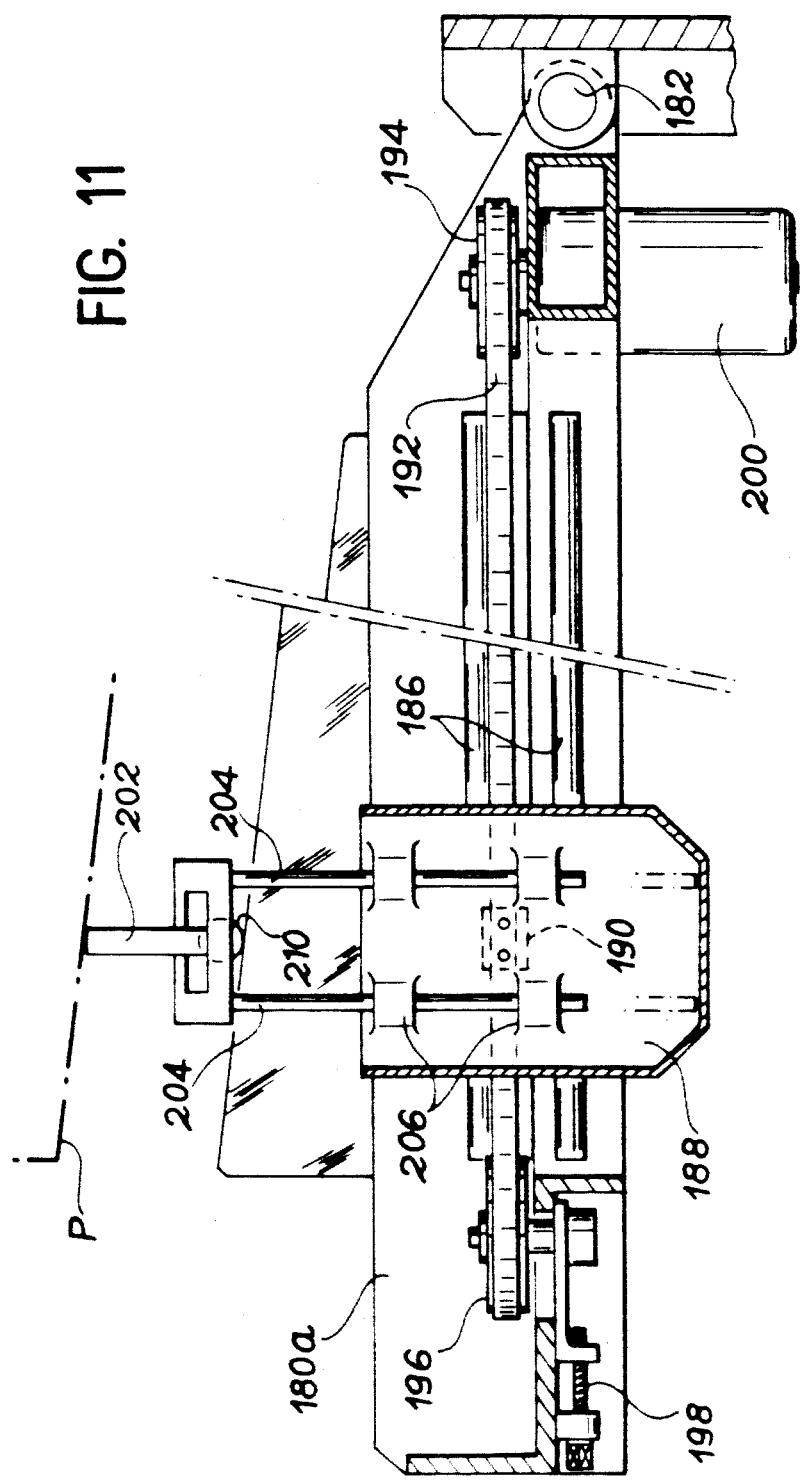
FIG. 11—A plan view of the weaving assembly shown in FIG. 8.
Figure 12:
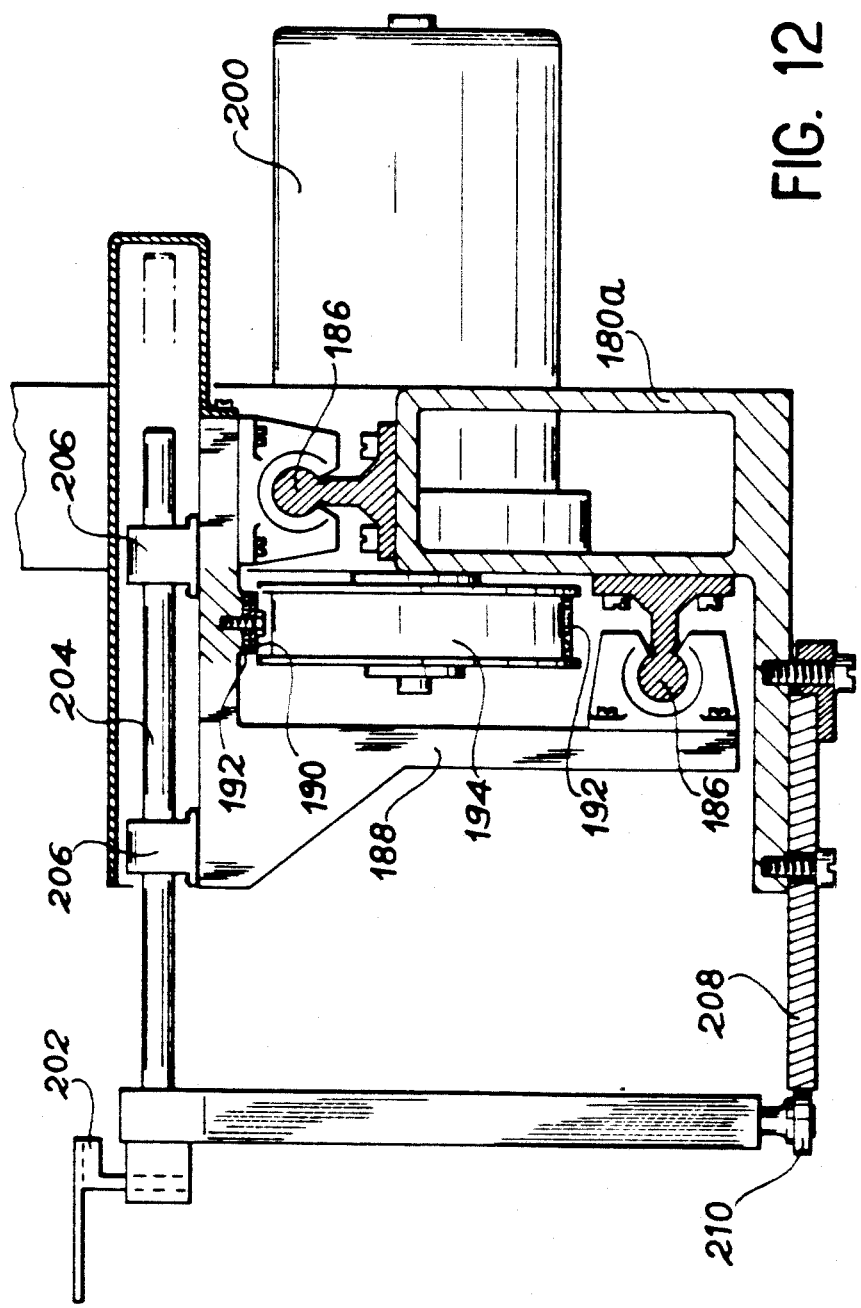
FIG. 12—A sectional view along line X—X in FIG. 9.

FIGS. 10 to 12 show the actual weaving system mounted on the lower beam 180a of the rigid frame 180. For this purpose, beam 180a is provided with rails 186 on its front face located to the side of the body and on its upper face. On said rails 186 is mounted a weaving carriage 188 joined by a plate 190 to a notched belt 192 mounted on two pulleys 194, 196, whose horizontal spindles are supported by two ends of beam 180a. The spindle of pulley 196 is mounted on beam 180a, so that it can move longitudinally when acting on a screw 198. This configuration makes it possible to regulate the tension of the belt. The displacement of the weaving carriage 188 along beam 180a is controlled by a motor 200 which rotates the spindle of pulley 194.

In its upper part, the weaving carriage 188 supports the weaving means 202, in such a way that the latter can move perpendicularly to the displacement direction of carriage 188 along beam 180a. For this purpose, the weaving means 202 is joined to two horizontal posts 204 perpendicular to beam 180a and slidingly received in ball guidance bearings 206 integral with carriage 188.

In the same way as for the mobile support 40 on which are mounted the different machining, implantation, winding and control subassemblies, the following of the profile of the body by the weaving means 202 is brought about by means of a weaving pattern or cam 208 interchangeably fixed to the lower face of beam 180a and on which bears a vertically axed roller 210 integral with weaving means 202.

As stated hereinbefore, the mounting of the weaving carriage 188 on the orientable rigid frame 180 makes it possible to move the weaving means parallel to the generatrix of the body to be produced in the case of simple bodies, such as a cylinder or cone, or parallel to the fictitious generatrix joining the ends of the body to be produced in the case of bodies having a more complex shape. Therefore, the form of the weaving pattern 208 is generally different from that of pattern 48 controlling the displacement of mobile support 40.

On again referring to FIG. 1, it can be seen that the upper beam 180b of rigid frame 180 regulatably supports two weft attachment systems 212 and, if appropriate, one or more weft lowering systems 214.

The weft attachment systems 212 are placed level with the ends of the body to be produced. They make it possible to eliminate the row of inclined wedges used in the prior art for attaching teh weft to each of the ends of the body. This solution is particularly advantageous in the case of very thick, large diameter bodies, because the production of rings carrying these inclined wedges is then very difficult and there is a significant risk of the attachment of the weft not taking place correctly on approaching the end of the wedges, bearing in mind the inevidtable flexibility thereof.

The weft attachment systems 212 are identical to the system described in French patent application No. 80 14640 of July 1, 1980 and jointly filed by the Commissariat à l'Energie Atomique and Brochier et Fils. It is simply pointed out that such a system makes it possible, following the provisional maintaining in place of the weft by means of a weft attachment fork during the outward movement of the weaving means 202, then by means of a weft pressing fork during the return movement of the weaving means, to definitively secure the weft end by placing a wound thread in an adjacent circumferential passage.

Finally, on again referring to FIG. 1, it can be seen that the upper beam 180b of the rigid weaving frame 180 can also support one or more weft lowering systems 214, which are used during the production of bodies having a more or less complex concave profile, in order to maintain the weft in the bottom of longitudinal passages during weaving. For example, in the case of producing a body constituted by two truncated cones joined by their smaller diameter, a weft lowering system 214 is positioned level with said smaller diameter.

Such a weft lowering system forms the object of French patent application No. 80 08178 filed on Apr. 11, 1980 jointly by the Commissariat à l'Energie Atomique and Brochier et Fils. Thus, no detailed description thereof will be provided here.

It is merely pointed out that the principle of this system is that immediately following the passage of the weaving means, the weft is provisionally held inplace by a retractable member and then, following a certain rotation of the body, the wefts are definitively kept level with the weft lowering system with the aid of a thread which is wound into one of the circumferential passages formed between the retaining rings.

Compared with the systems described in the aforementioned patent applications, the weft attachment and lowering systems 212, 214 used in the machine according to the invention essentially differ in that in place of acting above the body, they are located on the side thereof, in the same way as the weaving system, which facilitates access thereto in the case of a machine used in the production of large bodies and which makes it possible to remove the upper part of the machine, in order to permit the easy fitting of the mandrel prior to its machining and remove the finished body.

Obviously, in order to simplify its operation, the machine according to the invention can be equipped with various automatic means. Thus, in particular, the rotation of the spindle and consequently the body by a controlled motor permits two operating modes.

Thus, a speed control can be used in the case of winding and machining foam. In this case, it is possible to vary the speed from stop up to 60 r.p.m. in one or other direction. The motor controlling the spindle rotation can be position controlled during weaving, implantation or geometrical checking. It is therefore possible to programme the successive rotation of the spindle according to a preadjustable, given rotation angle.

In the same way, it has been seen that the displacement of the mobile support can be obtained either by controlling the spindle, or with the aid of an independent motor 60. The control of the displacement of the mobile support by the spindle corresponds to the operations of machining the mandrel, installing the retaining rings and winding. The position along X can be permanently known through the optical coder 62 associated with motor 60, which is then out of circuit.

Morover, the displacement of the mobile support controlled by motor 60 is used for fast movements of the carriage, which can also be positioned through the optical coder 62. A speed control of motor 60 makes it possible to obtain the desired positioning for the carriage by deceleration and braking at the programmed dimension. A photoelectric detector can also ensure an automatic resetting to zero of the coder 62 whenever the carriage passes in front of it.

An optical coder can also be associated with the motor controlling the movement of the weaving carriage in order to obtain information on the position of the latter along beam 180a. A speed control of the motor makes it possible to position the weaving carriage by deceleration and braking at the programmed dimension. A photoelectric cell also makes it possible to reset the coder to zero.

Finally, during successive winding and weaving stages, different dimensional controls can be performed following the formation of a certain number of layers. Thus, it is possible to check both during manufacture and at the end thereof both the dimensions of the body and its filling coefficient because the control is carried out at regular intervals.

What is claimed is:

1. A machine for the production of hollow bodies of revolution formed from threads extending in three directions, called the radial, axial and circumferential directions, wherein it comprises a chassis, a headstock mounted at one end of the chassis, a spindle supported in rotary manner by the headstock, means for controlling the rotation of the spindle, a tailstock mounted at the other end of the chassis in front of the spindle and defining therewith a substantially horizontal common axis, means for displacing the tailstock along said axis, a mobile support able to successively receive several interchangeable working subassemblies constituted by a retaining ring implantation subassembly and a winding subassembly, mounted on one side of the chassis with respect to said axis, first means for displacing the support parallel to said axis at a speed proportional to the rotation speed of said spindle, second means for controlling a fast displacement of the support parallel to said axis, means for displacing the support perpendicular to said axis, in order to follow a first pattern having the profile of the part or body to be produced, a weaving assembly mounted on the other side of the chassis with respect to said axis and having a beam supporting in a mobile manner a weaving carriage and means for moving the carriage along the beam in reciprocating manner, the weaving carriage supporting a weaving means via means for displacing the latter perpendicular with respect to said beam so as to follow a second pattern, the end of the beam adjacent to the headstock being articulated on a carriage, which can be moved perpendicularly to said axis by appropriate regulating means, the opposite end of the weaving beam being mounted on a slide fixed to the chassis.

2. A machine for the production of hollow bodies of revolution formed from threads extending in three directions, called the radial, axial and circumferential directions, wherein it comprises a chassis, a headstock mounted at one end of the chassis, a spindle supported in rotary manner by the headstock, means for controlling the rotation of the spindle, a tailstock mounted at the other end of the chassis in front of the spindle and defining therewith a substantially horizontal common axis, means for displacing the tailstock along said axis, a mobile support able to successively receive several interchangeable working subassemblies constituted by a retaining ring implantation subassembly and a winding subassembly, mounted on one side of the chassis with respect to said axis, first means for displacing the support parallel to said axis at a speed proportional to the rotation speed of said spindle, second means for controlling a fast displacement of the support parallel to said axis, means for displacing the support perpendicular to said axis, in order to follow a first pattern having the profile of the part or body to be produced, a weaving assembly mounted on the other side of the chassis with respect to said axis and having a beam supporting in a mobile manner a weaving carriage and means for moving the carriage along the beam in reciprocating manner, the weaving carriage supporting a weaving means via means for displacing the latter perpendicular with respect to said beam so as to follow a second pattern, the beam being mounted on the chassis via regulatable orientation means, the winding subassembly comprising a planar plate oriented perpendicular to said axis and which penetrates a circumferential winding passage formed between the retaining rings, in front of the winding thread, bearing in mind the rotation direction of the body.

3. A machine according to claim 1 or 2 wherein a dimensional control subassembly is permanently associated with the winding subassembly.

4. A machine according to claim 1 or 2, wherein the winding subassembly comprises an interchangeable part which can be replaced by a mandrel machining subassembly.

5. A machine according to claim 2, wherein means are provided for reversng the orientation of said plate as a function of the rotation direction of the body.

6. A machine according to claim 1 or 2, wherein a beam integral with the weaving beam and parallel thereto supports two weft attachment device positioned level with the ends of said body for holding in place the ends of the weft threads deposited by the weaving means during the deposition thereof.

* * * * *